A. F. MADDEN.
SPEED REGULATOR FOR PHONOGRAPHS AND THE LIKE.
APPLICATION FILED OCT. 31, 1914.
1,172,380.
Patented Feb. 22, 1916.
2 SHEETS—SHEET 1.
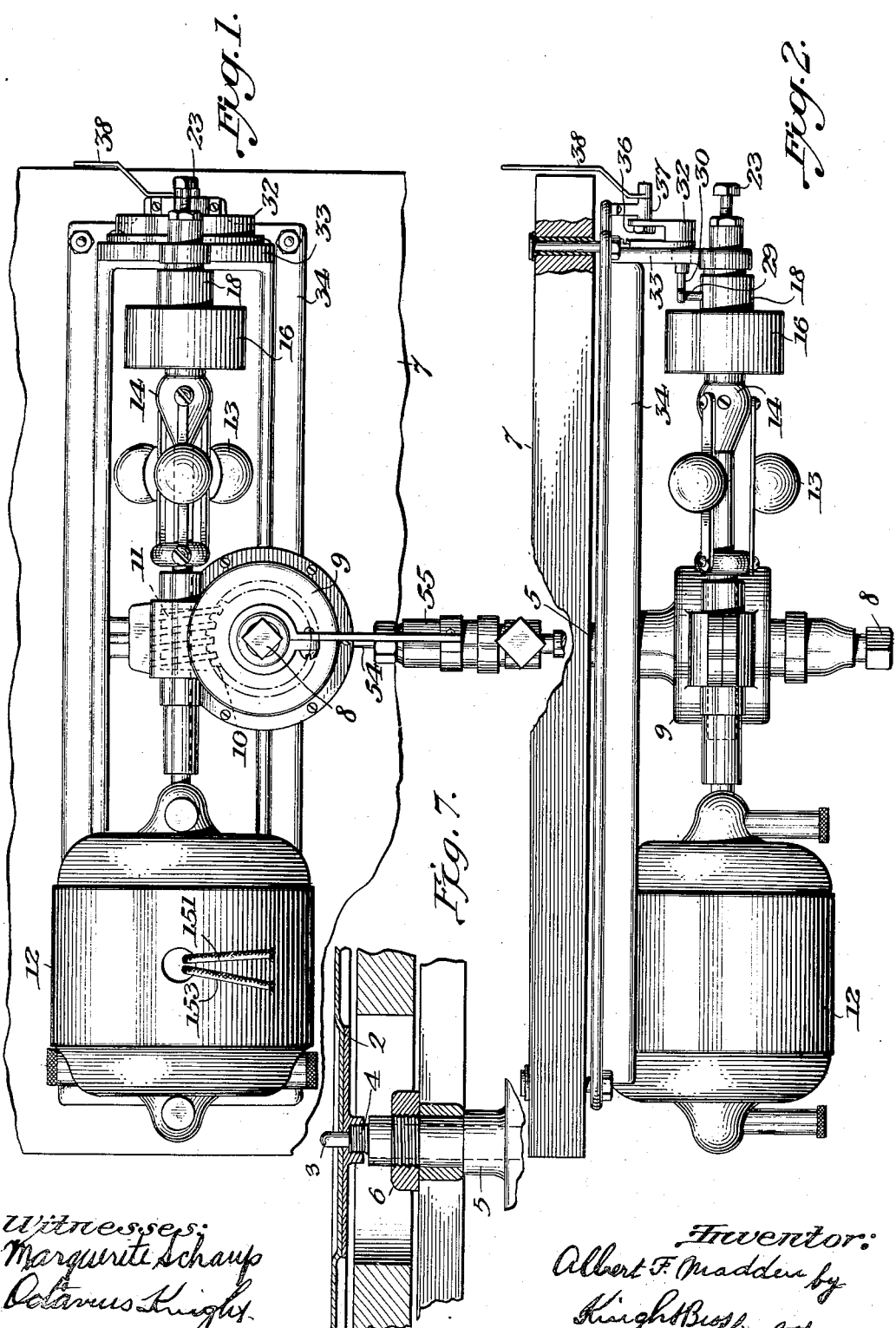

A. F. MADDEN.
SPEED REGULATOR FOR PHONOGRAPHS AND THE LIKE.
APPLICATION FILED OCT. 31, 1914.
1,172,380.
Patented Feb. 22, 1916.
2 SHEETS—SHEET 2.
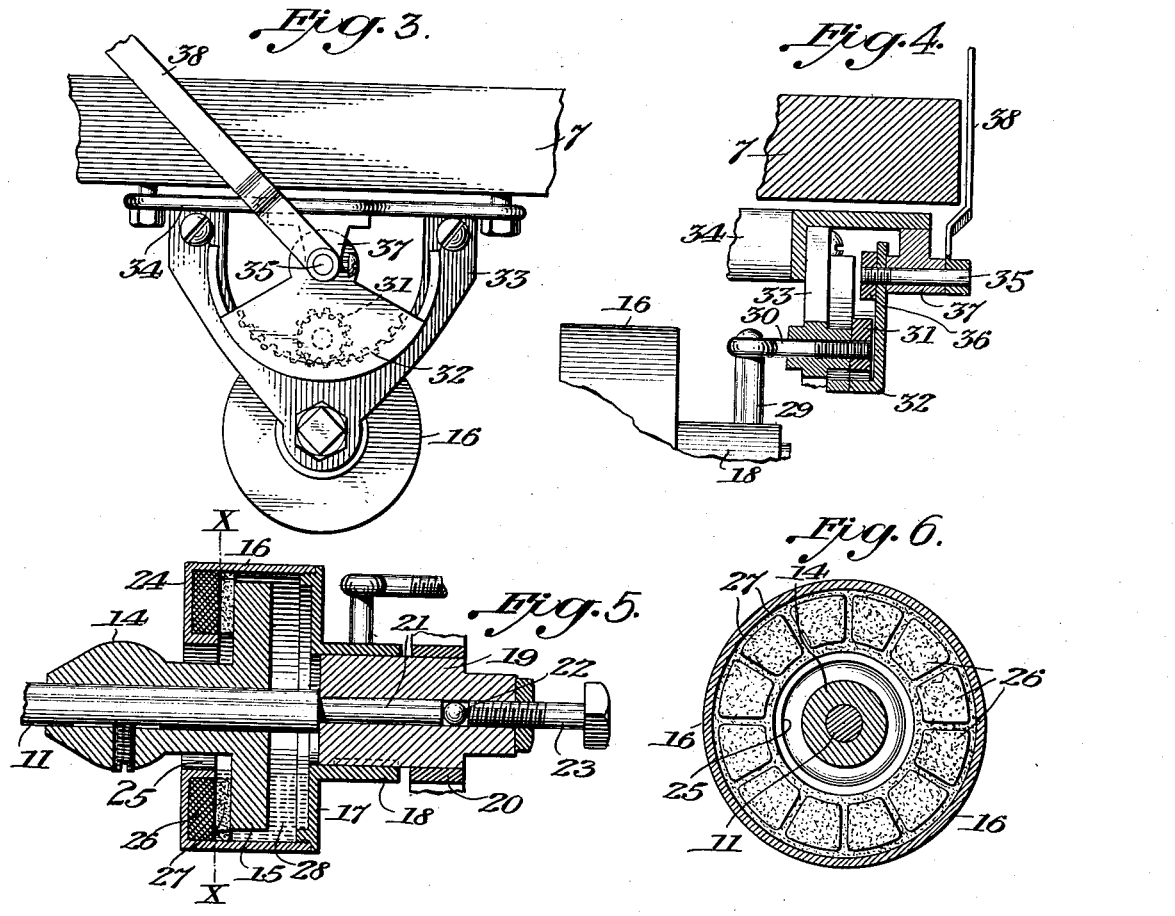

UNITED STATES PATENT OFFICE.

ALBERT F. MADDEN, OF NEWARK, NEW JERSEY, ASSIGNOR TO EDMUND H. LANSING, OF BOSTON, MASSACHUSETTS.

SPEED-REGULATOR FOR PHONOGRAPHS AND THE LIKE.

1,172,380.  Specification of Letters Patent.  Patented Feb. 22, 1916.

Original application filed July 7, 1914, Serial No. 849,432. Divided and this application filed October 31, 1914. Serial No. 869,644.

*To all whom it may concern:*

Be it known that I, ALBERT F. MADDEN, a citizen of the United States, residing in the city of Newark, county of Essex, State of New Jersey, have invented certain new and useful Improvements in Speed-Regulators for Phonographs and the like, of which the following is a full and clear specification.

My invention relates in general to phonographs of the disk type and more especially to motor driven phonographs in which mechanism is provided for automatically stopping and repeating the reproduction.

The present application is a division of my prior application on motor driven phonographs, filed July 7th, 1914, Serial No. 849,432, which became Patent No. 1,127,056, dated February 2nd, 1915. The particular feature of the present case resides in a speed regulator.

In order to indefinitely repeat the reproduction on phonographs, it is desirable that some form of power drive be employed which is continuous in its operation, that is to say, to avoid the necessity of intermittent winding or storing of power in the drive mechanism as takes place in the usual spring motor driven phonographs. Power is also necessary to actuate the repeating mechanisms. The term "motor" as employed herein, is intended to indicate a power motor, preferably electric, to distinguish the driving means from the usual spring power drive mechanism in which the energy is stored by a manual operation in the act of winding.

It has heretofore been proposed to employ the electric motor for driving phonographs. Due to the variation in line voltage which is usually experienced in the operation of electric motors, considerable difficulty has been met in applying the electric motor drive to phonographs. The pitch of the tone reproduced by the phonograph, is of course under the direct influence of the speed at which the record is driven, and the slightest perceptible variation in the speed of the record interferes with the quality of the reproduction. It will therefore be apparent that the success of a repeating phonograph depends in a large measure upon the proper control of the driving mechanism employed and that the use of an electric motor can be practicable only when accompanied by a positive and reliable speed control for the motor.

According to my invention I employ preferably an electric motor in conjunction with a reliable governor of special design.

The invention will be more clearly understood from the description of a specific embodiment of the invention which I have illustrated by way of example in the accompanying drawings. It will be understood that the details of construction herein shown are only given to enable those skilled in this art to understand the principles of my invention and to make and use the same, as it will be apparent that the principles which form the basis of my present invention may be applied or utilized in many different constructions while still gaining the desired results.

Figure 1 is an underneath plan view of the electric motor and speed control devices; Fig. 2 is a front elevation of the same; Fig. 3 is a side elevation of the manually operated speed regulator; Fig. 4 is a front vertical section of the same; Fig. 5 is a similar view of the friction brake running in oil; Fig. 6 is a face view of the friction surface employed; Fig. 7 is a detail vertical section showing the main shaft or arbor and turntable of the phonograph.

Referring more specifically to said drawings, 1 indicates the cabinet of the machine, 2 the turn-table or record support, and 3 the main shaft or arbor by which the turntable and record are supported and driven. The turn-table 2 is threaded onto the arbor 3 at the point 4, and the arbor rotates in a bearing 5, which is secured by threaded collar 6 resting upon the support 7, which forms a part of the cabinet 1, (see Fig. 7). The arbor 3 rests upon a step bearing indicated at 8 in Figs. 1 and 2. Arbor 3 passes through a housing 9 within which a worm gear 10 secured on said arbor operates under the influence of a worm shaft 11, driven by electric motor 12. Shaft 11 has operatively coupled therewith a centrifugal device 13, the sliding member 14 of which terminates in a disk 15 within the friction brake housing 16, as illustrated in Fig. 5. The housing 16 has threaded into it a head portion 17, the tubular extension 18 of which is slidably mounted upon a bearing stud 19, which is fixed in the framework 20. Stud 19 is formed with an axial bore in which the reduced end 21 of the shaft 11 is journaled. A ball stop 22 is positioned in said bore by the set screw 23. The inner face 24 of the housing 16 has a tubular inward extension 25 projecting axially toward the disk 15 of the sliding member 14, and in the annular pocket thus provided, a friction body of leather or other absorbent material 26 is disposed having its exposed face provided with radial grooves 27.

The space within the housing 16 is supplied with a body of lubricating oil 28 in which the disk 15 runs. The disk 15 engages the friction material 26 and tends to retard the rotation of the shaft 11. During the rotation of the disk 15, lubricating oil is continuously carried inward by absorption of the leather and outward by the disk so that the entire surface of the friction material 26 is thoroughly lubricated, this result being aided by the grooves 27 formed in the lubricating material 26, whereby the lubricating oil is better presented. The high speed of the motor and disk necessitates a thorough and constant lubricating of the friction surface at all times as otherwise it would be impossible to accurately control the speed of the drive, due to irregular friction and generation of heat. It is this difficulty which has heretofore stood in the way of the successful application of the motor drive to phonographs.

The friction exerted between the material 26 and the disk 15 may be manually regulated. For this purpose the housing 16 is slidably mounted on the stud 19, as above referred to, and any suitable regulating mechanism may be employed for controlling the position of the housing 16. I have herein shown this regulating mechanism as comprising a pin 29 which engages in a perforation formed in sleeve 18, and which is operated axially, of shaft 11 by a screw 30 slid in and out by pinion 31 and segment gear 32. Screw 30 is slidably mounted in bracket 33 which is secured to the framework 34. Segment gear 32 is fixed on shaft or stud 35 by a nut 36, and shaft 35 is freely journaled in the bearing 37 which depends from the framework 34. An operating handle 38 is fixed on the outer end of shaft 35 for rotating the same when the friction brake is to be adjusted manually.

It will be seen that during the operation of the motor 12, the sliding member 14 of the governor 13 will assume a normal position on shaft 11, in which position a constant friction will be exerted between disk 15 and the friction material 26. Any tendency toward increased speed of motor 12 draws the disk 15 into firmer engagement with the friction material 26 so that the retarding influence of the brake is increased and thus the increased speed of the motor is checked. Should the power of the motor 12 tend to diminish, the pressure exerted by disk 15 against the friction material 26 is relieved so that the motor may continue to operate at the same speed. This normal speed is, of course, at all times under the control of the manual adjustment effected through the operation of lever 38.

The mechanism thus far described constitutes the adjustable constant speed motor drive for the phonograph. The reliable speed control above described, makes it possible to employ the same motor for supplying compressed air to a pneumatic repeating system, without interfering with the pitch of the tone being reproduced. A pressure of from one to two pounds, which may amply suffice for the pneumatic devices, may be generated in this way without perceptible variation in the speed of the motor. A pneumatic repeating system which I have employed for some time with entirely satisfactory results as shown and described in my original application of which this application is a division. Inasmuch as the repeating mechanism does not form any specific feature of the present invention the same is not shown in the present application.

I claim:

1. A speed regulator for phonographs and the like comprising in combination a centrifugal device and a friction brake connected therewith, comprising an absorbent brake body and a disk drawn together by said centrifugal device and immersed in oil.

2. A speed regulator for phonographs and the like comprising in combination a rotary part to be driven, a centrifugal device operatively connected therewith, stationary and movable friction members engaging each other, one having an engaging face of absorbent material, said movable friction member controlled and rotating with said centrifugal device, and a casing inclosing said friction members and adapted to contain a body of oil in which said friction members are immersed.

3. A speed regulator for phonographs and the like comprising a centrifugal device, and a variable friction brake operated thereby, said friction brake comprising rotary and stationary parts opposed to each other and immersed in oil, one of said parts being formed of absorbent material and having its operating surface interrupted.

4. A speed regulator for motor driven phonographs and the like comprising in combination a rotary part to be driven and a speed governor therefor, said speed governor having a variable friction brake and said variable friction brake comprising rotary and stationary parts opposed to each other and immersed in oil, one of said parts being formed of absorbent material and having its operating surface grooved.

5. A speed regulator for phonographs and the like comprising in combination a rotary part and a variable friction brake operatively related thereto, said variable friction brake having rotary and stationary parts opposed to each other and immersed in oil, the stationary part being formed of absorbent material and having its operating surface radially grooved.

ALBERT F. MADDEN.

Witnesses:
WM. A. COURTLAND,
OCTAVIUS KNIGHT.